United States Patent
Wang

(10) Patent No.: US 9,464,932 B2
(45) Date of Patent: Oct. 11, 2016

(54) DRAFT SHIELD FOR A BALANCE WITH AN INTEGRAL SPRING ELEMENT AND HOLDER ELEMENT FORMED WITH THE TOP RAIL MEMBERS FOR SECURING THE UPPER CORNERS OF THE FRONT WALL

(71) Applicant: Mettler-Toledo AG, Greifensee (CH)

(72) Inventor: Heqiao Wang, Shanghai (CN)

(73) Assignee: Mettler-Toledo GmbH, Greifensee (CH)

( * ) Notice: Subject to any disclaimer, the term of this patent is extended or adjusted under 35 U.S.C. 154(b) by 109 days.

(21) Appl. No.: 14/419,144

(22) PCT Filed: Jul. 11, 2013

(86) PCT No.: PCT/EP2013/064708
§ 371 (c)(1),
(2) Date: Feb. 2, 2015

(87) PCT Pub. No.: WO2014/032841
PCT Pub. Date: Mar. 6, 2014

(65) Prior Publication Data
US 2015/0198476 A1     Jul. 16, 2015

(30) Foreign Application Priority Data
Aug. 30, 2012  (CN) .......................... 2012 1 0316277

(51) Int. Cl.
*G01G 21/28*     (2006.01)

(52) U.S. Cl.
CPC .................................. *G01G 21/286* (2013.01)

(58) Field of Classification Search
CPC ....................................................... G01G 21/286
See application file for complete search history.

(56) References Cited

U.S. PATENT DOCUMENTS

| | | |
|---|---|---|
| 5,411,348 A | 5/1995 | Balsells |
| 6,686,545 B2 | 2/2004 | Lüchinger et al. |
| 6,849,809 B2 | 2/2005 | Lüchinger et al. |
| 6,909,058 B2 | 6/2005 | Lüchinger et al. |
| 8,198,553 B2 | 6/2012 | Dürst et al. |
| 2012/0111646 A1 | 5/2012 | Schillig |

*Primary Examiner* — Randy W Gibson
(74) *Attorney, Agent, or Firm* — Standley Law Group LLP

(57) ABSTRACT

A draft shield (1) for a balance has a rear wall (2), a front wall (11), two side walls (9, 10), a top cover 8, and rail members (3, 4) which extend from the upper corners of the rear wall (2) to the upper corners of the front wall (11) and carry guide tracks (5, 6, 7) in which the top cover (8) and the side walls (9, 10) are slidably seated. According to the invention, each rail member (3, 4) includes at its front end a spring element and a holder element which are integrally connected to the rail members (3, 4) and are made of one piece with the latter. The spring elements and the holder elements are arranged on the rail members (3, 4) in such a way that the front wall (11) can be inserted between the spring elements (16) and the holder elements (17), and as a result of said insertion the front wall (11) will be secured to the rail members (3, 4).

21 Claims, 4 Drawing Sheets

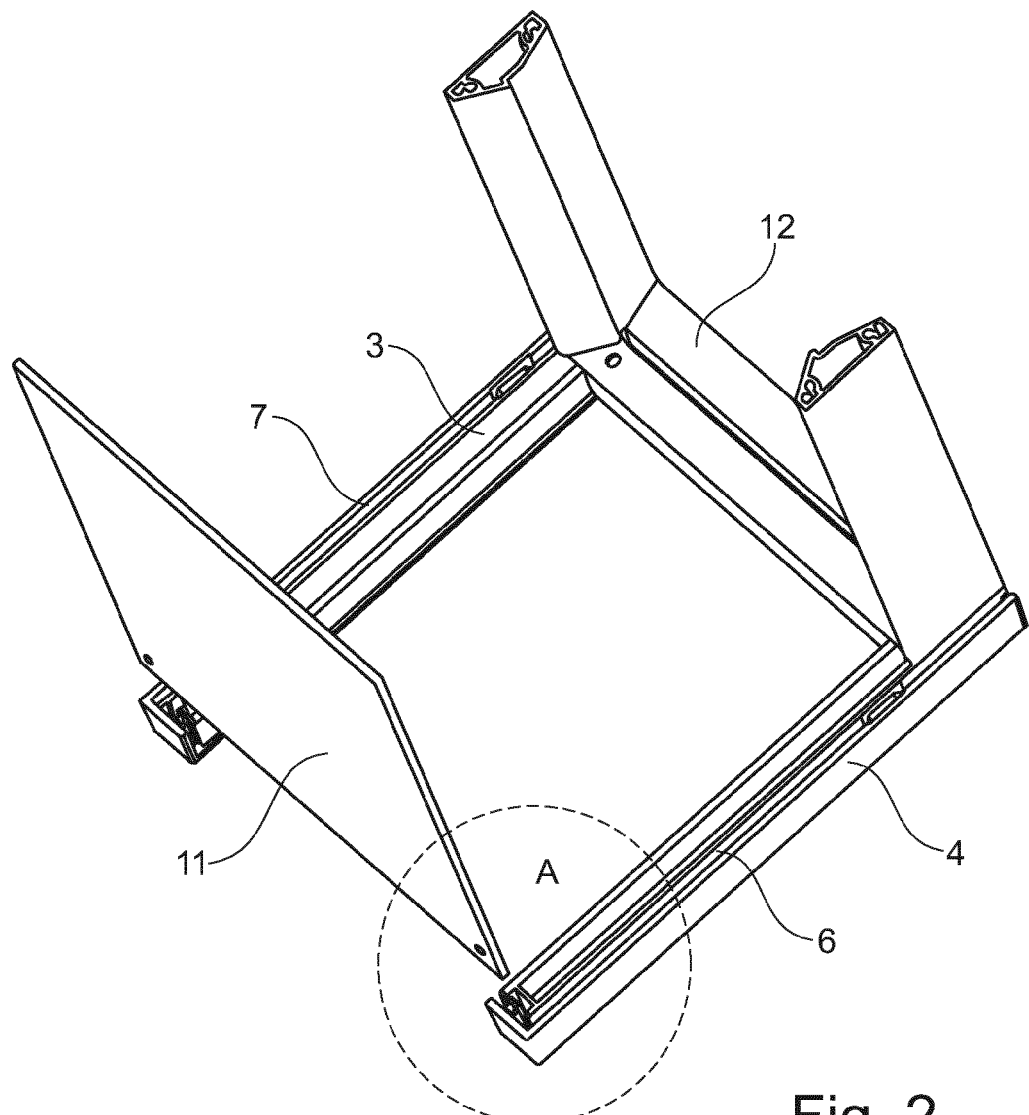
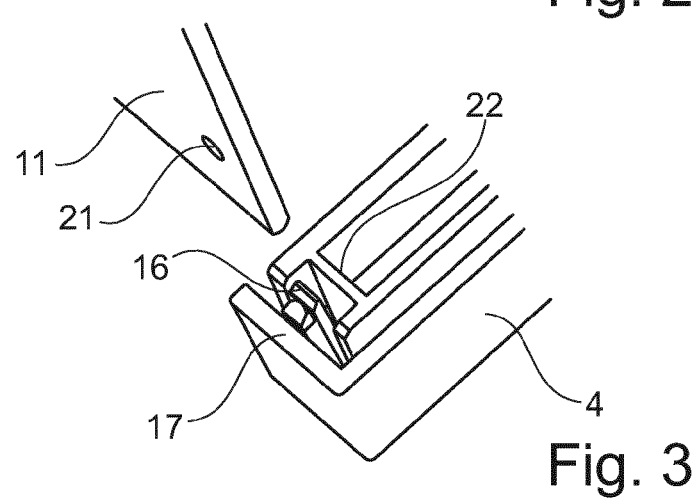
Fig. 2
Fig. 3

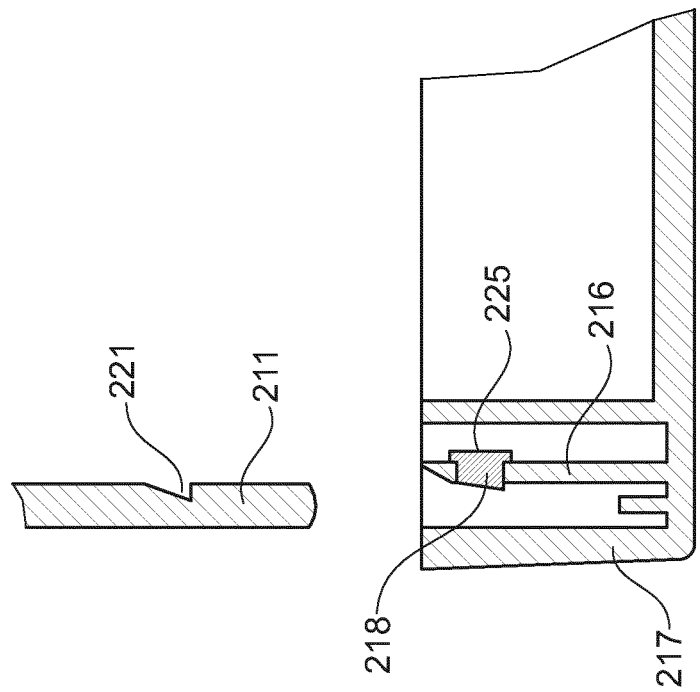
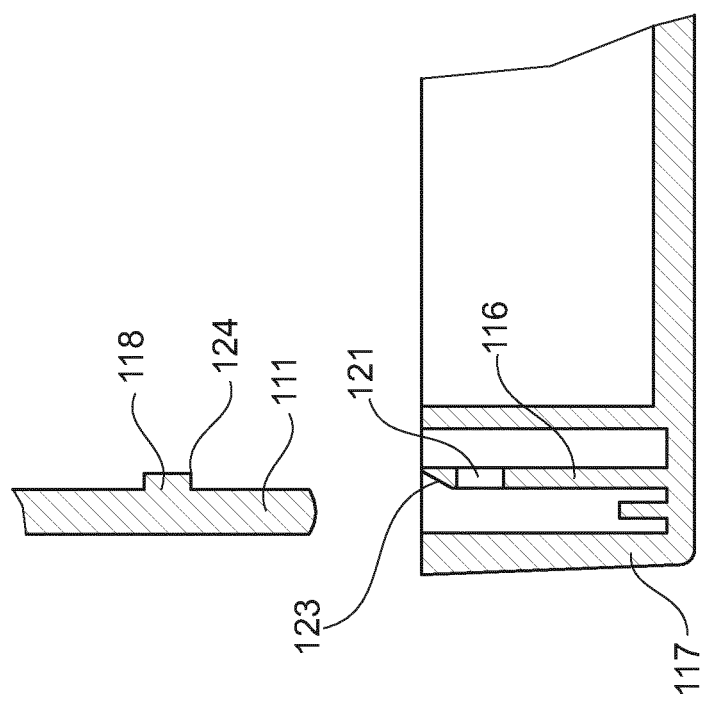

DRAFT SHIELD FOR A BALANCE WITH AN INTEGRAL SPRING ELEMENT AND HOLDER ELEMENT FORMED WITH THE TOP RAIL MEMBERS FOR SECURING THE UPPER CORNERS OF THE FRONT WALL

The invention concerns a draft protection device for a balance, commonly called a draft shield, in particular for those kinds of balances which in their standard model version are typically not equipped with a draft shield. Accordingly, the invention relates to a kind of draft shield which can also be purchased and installed later by the customer as an accessory to a balance.

Draft shields in balances of high accuracy which, accordingly, are also very sensitive, have the purpose to prevent that the weighing result is adversely affected by the movements of the ambient air. Such air drafts, which can be caused for example by air-conditioning systems or by open doors and windows, can exert steady or fluctuating forces on the weighing pan which will manifest themselves to the user of the balance as errors, fluctuations and irregularities of the displayed weighing result. Draft shields typically come in the form of a cabinet that is arranged on the scale housing and surrounds the weighing pan with a bottom plate, a front wall, a rear wall, side walls and a top cover. The space enclosed by the draft shield is referred to as the weighing compartment. Draft shields are designed so that they can be opened and closed, for example with sliding side walls, in order to allow weighing samples to be put on the weighing pan as well as removed from it. The front- and side walls as well as the top cover of the draft shield are normally transparent so as to allow a direct view at the interior of the weighing compartment and the weighing pan with the weighing object. A passage opening, normally in the bottom of the weighing compartment, provides contact-free clearance for the passage of a load transfer element, which connects the weighing pan that is located in the weighing compartment to a weighing cell that is arranged in the balance housing.

Draft shield devices of the kind mentioned in the introductory paragraph, which are not necessarily part of the standard model version of a balance but can be purchased and installed later if they are needed, are often found to be desirable or useful in precision balances with a display resolution of 0.01 grams or even 0.1 grams, if the balances are exposed to stronger air movements during operation, which lead to fluctuations, uncertainties and errors of the displayed weighing result. In balances of higher resolution, i.e. displaying the weighing result with three or more decimals, this problem is found already in a relatively undisturbed ambient atmosphere. This is the reason why such balances normally have a draft shield in their standard model version. Balances with a coarser resolution, on the other hand, where the result is indicated in steps of one, two, five or more grams, are normally insensitive to air movements, so that there is no need for any draft shield, whether installed as standard equipment or available for purchase as an accessory.

In the following examples of the existing state of the art as well as in the description of the draft shield according to the invention itself, expressions such as "on top", "at the bottom", "in front", "to the rear", "left" and "right" are always meant in reference to a draft shield that is installed and ready for operation in its normal working position as seen from the direction of the user.

A draft shield that can be manufactured as an accessory which can be purchased separately from the balance and installed by the user is described for example in the German Patent Application Publication DE 10 2008 008 486 A1. This draft shield is aimed in particular at applications where the draft shield is exposed to contamination, for example by sample residues, and therefore requires frequent cleaning by the user. The draft shield is therefore designed so that the parts to be cleaned, i.e. the front- and side walls and the top cover panel can be removed easily without tools. This is accomplished with two locking elements at the frontal top corners of the draft shield. With a simple twist of these locking elements, the front wall is unlocked from its position and can be taken off, opening the way for the side walls and top cover to be pulled all the way out of the front of the draft shield. A drawback of this concept is the complexity and manufacturing cost for the locking elements, making it difficult to justify for applications where the draft shield is not exposed to contamination and where ease of cleaning is therefore not an issue.

Another draft shield that is suitable for installation by the user is described in US 2012/111646 A1. The walls of this draft shield form a box-like enclosure which can be set over the balance and stands by itself on the same work surface as the balance. The bottom edges of the front wall and the rear wall are raised sufficiently to allow the display- and operating portion as well as the rear portion of the balance to protrude from below the front and rear walls, with the lower parts of the side walls straddling the balance. The side walls are not intended to be opened and closed for every weighing operation. Rather, portions of the side walls can be removed by pulling them upward out of the draft shield frame. A further feature of this draft shield is that it can be manufactured as a kit for assembly by the user, with the panels, frame parts and fastener hardware delivered to the user in a flat, compact package. While this approach is highly economical, it is limited to applications where it is desirable to remove (rather than temporarily open) at least one side wall, for example serial weighings in a relatively quiet room atmosphere.

A solution that would overcome these concerns with the aforementioned state-of-the art draft shields should include side walls that can be opened and closed (rather than removing them completely), but without the complexity and cost of the quick-release feature of DE 10 2008 008 486 A1, which cannot be justified for the majority of applications in which draft shields are used. It suggests itself therefore to look for a solution in which the quick-release locking feature of DE 10 2008 008 486 A1 is replaced with a simpler and more cost-effective connection.

A solution for connecting and disconnecting, locking and unlocking, and holding members to one another is described in U.S. Pat. No. 5,411,348. Applying the proposed concept for example to the connection between the front wall and a frame member, an edge or corner of the front wall would be seated in a channel or recess of a frame member. The connection according to U.S. Pat. No. 5,411,348 would be secured by a compressed elastic locking element that fills the space formed by a groove on an inside flank of the channel and an opposing groove on the surface of the front wall panel. The concerns with such a solution are that a groove in a glass wall panel would be expensive to produce and also that the required forced insertion of the wall panel into a channel of a frame member would push the flanks of the channel apart and would therefore not be compatible with a relatively slender design that is desirable for the frame members of a draft shield.

In view of the aforementioned concerns with solutions of the existing state of the art, it is therefore the object of the present invention to provide a draft shield of the kind that can be installed on the balance by the user but offers a more cost-effective design than the aforementioned state-of-the-art solutions.

This task is solved by the draft shield of this invention in accordance with independent claim 1 and its dependent claims.

A draft shield according to the present invention has a rear wall, a front wall, two side walls, a top cover, and rail members which extend from the upper corners of the rear wall to the upper corners of the front wall and carry guide tracks in which the side walls and the top cover can be slidably seated. In particular according to the invention, each rail member includes at its front end a spring element and a holder element, wherein the spring element and the holder element are integrally connected to the rail members and are made of one piece with the latter. The spring elements and the holder elements are arranged on the rail members in such a way that the front wall can be inserted between the holder elements and the spring elements, whereby the front wall can be secured to the rail members.

In preferred embodiments of the invention, each of the spring elements in its respective rail member includes a projection, while the front wall has hollowed-out areas cooperating with the projections, or each of the spring elements includes a hollowed-out area while the front wall has projections cooperating with the hollowed-out areas. The projections, pushed into the hollowed-out areas by the spring force of the spring element, preferably establish a form-locked engagement, also referred to as a positive engagement, which secures the front wall to the rail members.

In a variation of the foregoing concept, with a different shape of the projections and/or the hollowed-out areas, the projections, pushed into the hollowed-out areas by the spring force of the spring element, could also form a force-locked or non-positive connection between the front wall and the rail members where, with a certain amount of effort, the front wall could be pulled out of its seat between the spring element and the holder element.

The spring element, which establishes the connection of the front wall to the rail members either through a form-locked or force-locked engagement, can be configured as a leaf spring with an insert, wherein a first end of the leaf spring is connected to the rail member and a second end of the leaf spring carries the insert.

Preferably, the leaf spring with the insert is arranged so that the spring force of the leaf spring acts in the direction towards the holder element. Further, in embodiments where the leaf spring carries an insert, the leaf spring is preferably arranged so that the insert faces towards the holder element.

In those embodiments of the draft shield according to the invention where the aforementioned hollowed-out areas are arranged in the front wall, they are preferably configured as recesses and in particular as holes in the front wall.

In embodiments where the leaf spring constituting the spring element carries an insert, the insert may include the aforementioned projection that is arranged on the spring element.

Alternatively, in embodiments where the leaf spring constituting the spring element carries an insert, the insert may include a recess for the engagement with a projection of the front wall.

In embodiments where the spring element is constituted as a leaf spring, the latter preferably extends in a plane which is oriented parallel to the holder element. Alternatively, in different configurations of the draft shield according to the invention, the plane of the leaf spring may be oriented at a right angle to the holder element.

In embodiments where the leaf spring constituting the spring element carries an insert, the insert preferably has one side that is slanted at an angle, so that when the front wall is inserted between the spring element and the holder element, the front wall comes first into contact with the slanted side of the insert and glides along the slanted side, whereby the insert is pushed out of the way of the front wall and the insertion of the front wall between the spring element and the holder element is facilitated.

Each of the rail members in preferred embodiments of the invention preferably includes a displacement-limiting element which prevents the spring element from being bent too far in the direction against the effective spring force.

In any embodiment of the invention, it is advantageous if the spring element has a tool engagement surface where an external force can be applied to push the spring element away from the holder element.

For example, to replace a damaged front wall, the attachment of the front wall to the rail members has to be unlocked by pushing the spring element away from the front wall and thereby releasing the form-locking or clamping engagement. This can be conveniently accomplished by pushing with a suitable tool, for example a screw driver or a knife, against the tool engagement surface to force the spring element away from the front wall.

The draft shield according to the invention will be described in more detail in the following drawings, wherein elements that are identical from one drawing figure to the next carry the same reference symbols, and wherein FIG. 1 represents a complete draft shield according to the invention;

FIG. 2 shows parts of the draft shield of FIG. 1 in an upside-down position in the process of being assembled;

FIG. 3 represents an enlarged view of detail A of FIG. 2;

FIG. 7 illustrates a first alternative for the connection between the front wall and the rail members; and FIG. 8 illustrates a second alternative for the connection between the front wall and the rail members.

Figure 1:
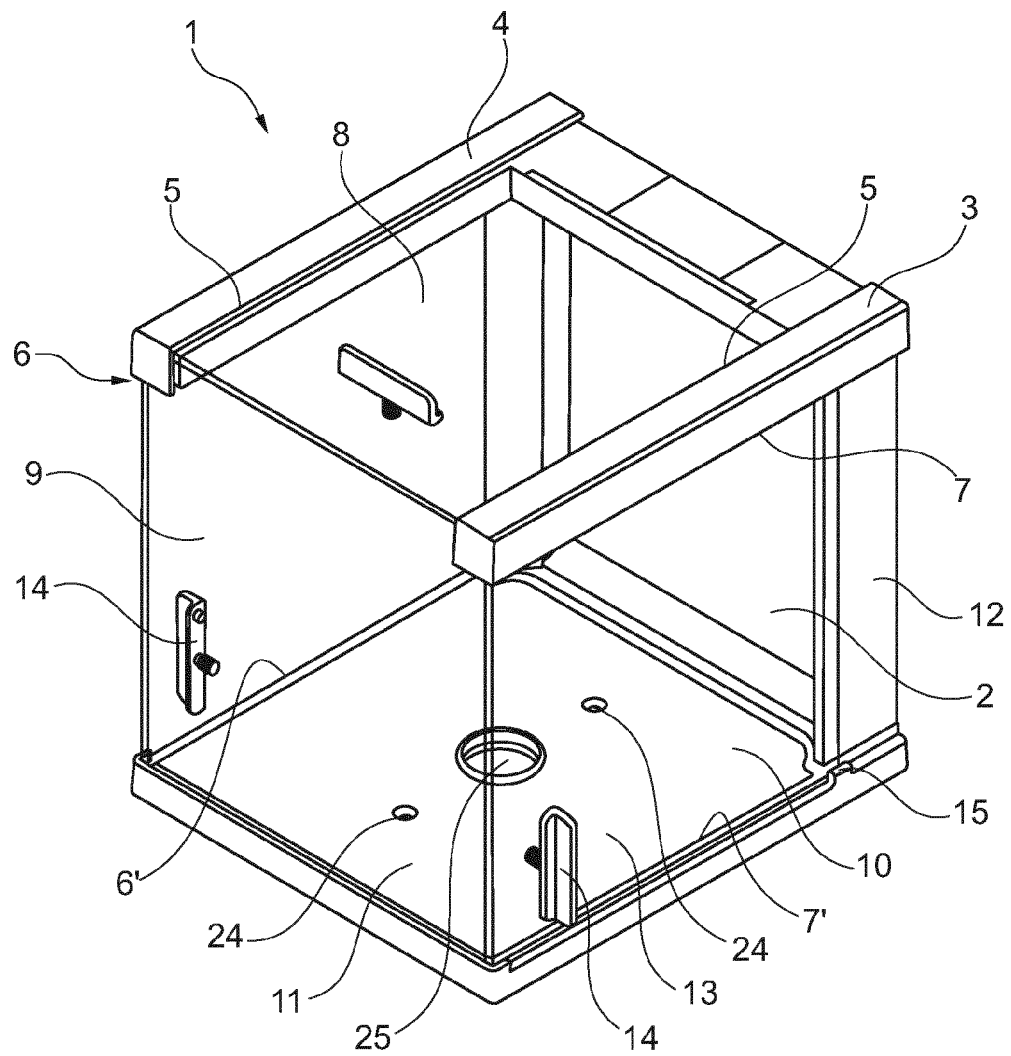

FIG. 1 shows a draft shield 1 according to the invention with a front wall 11, rear wall 2, side walls 9 and 10, a top cover 8, and a floor plate 13. Fastening holes 24 in the floor plate 13 serve to secure the draft shield 1 to the top surface of a balance (not shown in the drawing). The floor plate 13 has a passage opening 25 for the load receiver of the balance which, in the installed and operative condition of the draft shield 1, will carry a weighing pan. At its rearward end, the floor plate 13 is connected to a frame 12 which encloses a rear wall 2. Attached to the upper corners of this frame 12 are two rail members 3, 4 which extend forward in a horizontal plane. At their undersides, these rail members 3, 4 carry guide tracks 6, 7 which, together with guide tracks 6', 7' on the topside of the floor plate, serve to guide the sidewalls 9, 10 which are shown in their closed position and can be opened by pushing them to the rear. Guide tracks 5, which are also arranged in the rail members 3, 4, serve to receive the top cover panel 8 which can likewise be opened by pushing it to the rear.

To slide the sidewalls 9, 10 to the rear in order to open the draft shield 1, there are handles 14 which, in cooperation with end stops 15, serve to ensure that the sidewalls 9, 10 in the fully open position are still safely held in place by the guide tracks 6, 6' and 7, 7'. The same purpose is served by a handle 14 of the top cover panel 8.

To illustrate the specifics of the invention, FIG. 2 shows parts of the draft shield 1 in the process of being assembled. The frame 12 with attached rail members 3 and 4 is shown in an upside-down position with the guide tracks 6, 7 facing the viewer. The front wall 11 is ready to be inserted into the rail members 3 and 4.

Figure 4:
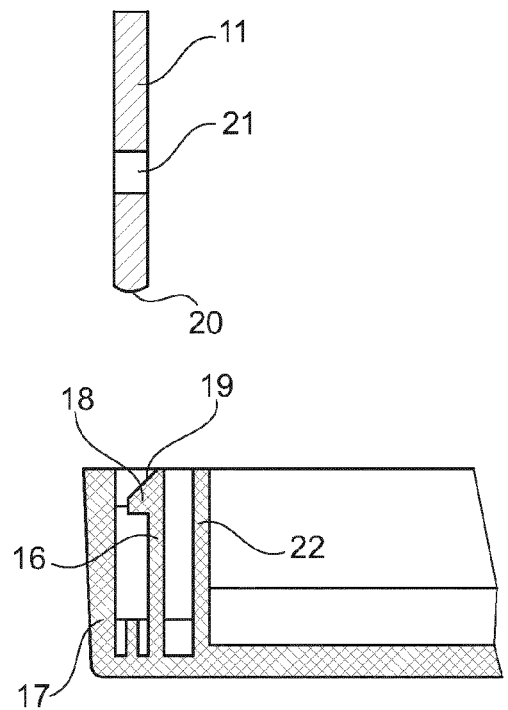
FIG. 4 represents the enlarged detail of FIG. 3 in a sectional side view, with the front wall ready to be inserted in the rail member.

The detail area A of FIG. 2 is shown enlarged in a perspective view in FIG. 3 and in a sectional view from the side in FIG. 4, which represents (again in an upside-down orientation) an upper corner of the front wall 11 and the front end of the rail member 4. The rail member 4 in this example is formed in one integral piece, for example as a die-cast or injection-molded part in which a spring element 16 and a holder element 17 are integrally incorporated. As shown most clearly in FIG. 4, the spring element has a nose-shaped projection 18 with a ramp surface 19. When the front wall 11 is inserted between the spring element 16 and the holder element 17, the edge 20 of the front wall 11 will meet the ramp surface 19 of the nose-shaped projection 18 and glide along it, thereby pushing the spring element 16 away from the holder element 17.

Figure 5:
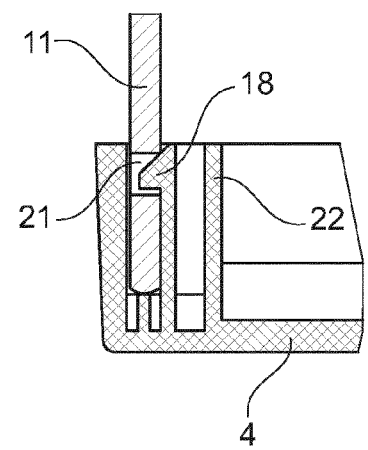
FIG. 5 shows the same detail portion of the draft shield as FIGS. 3 and 4, but with the front wall inserted and locked in position.

In the fully inserted position of the front wall 11, which is illustrated in FIG. 5, the nose-shaped projection 18 snaps into the hollowed-out area 21 of the front wall 11, whereby the front wall 11 is locked in place in the rail member 4.

Figure 6:
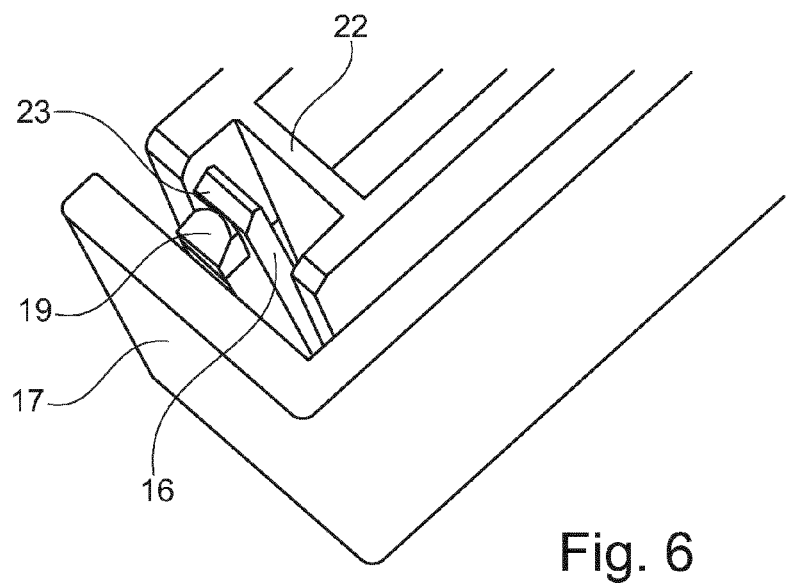
FIG. 6 represents a further enlarged part of FIG. 3.

In a further enlarged detail view, FIG. 6 shows the end portion of the rail member 4 of FIG. 2 in order to more clearly illustrate two additional features of the foregoing example. The end surface 23 of the spring element 16 which borders on the ramp surface 19 of the nose-shaped projection 18 serves as a tool engagement surface 23 where an external force can be applied with a suitable tool to push the spring element 16 away from the inserted front wall 11. For example, to replace a damaged front wall 11, the attachment of the front wall 11 to the rail members 3, 4 can be unlocked by pushing the spring element 16 away from the front wall 11 and thereby releasing the form-locking or clamping engagement. This can be conveniently accomplished by inserting a suitable tool, for example a screw driver or a knife, between the front wall 11 and the tool engagement surface 23 to pry the spring element away from the front wall 1. A displacement-limiting element 22 prevents the spring element 16 from being bent back too far and getting broken in the unlocking process.

The hollowed-out areas 21 of the front wall 11 can be drilled round passage holes, or the front wall 11 could also be produced through a molding process, in which case the hollowed-out areas 21 could be openings or recesses of any shape compatible with the molding process.

Alternatively, as shown in FIG. 7, a projection 118 could be formed on a front wall 111, with a corresponding hollowed-out area 121 being arranged on the spring element 116. The projection 118 in this case does not require a ramp surface, as the leading edge 124 of the projection 118 can glide along the slanted end surface 123 of the spring element 116 and thereby push back the spring element during the insertion of the front wall 111.

In a variation of the preceding embodiments of FIGS. 1 to 7, the projection could be formed on an insert of the spring element or the front wall. As an example, in the embodiment of FIG. 8 the spring element 216 carries an insert 225 with a nose-shaped projection 218 which cooperates with a corresponding recess 221 of the front wall 211. The insert 225 in this example is configured as a plug that has been pressed from the back into an opening of the spring element 216.

Although the invention has been described through the presentation of specific examples of embodiments, it will be evident to the reader that numerous further variant embodiments could be developed from the teachings of the present invention, for example by combining the features of the individual examples with each other and/or be interchanging individual functional units between the embodiments described herein. It goes without saying that any such variant embodiments are considered to be part of the present invention.

LIST OF REFERENCE SYMBOLS 1 draft shield
2 rear wall
3, 4 rail members
5 guide tracks in 3, 4 for top cover 8
6, 7 guide tracks in 3, 4 for side walls 9, 10
6', 7' guide tracks in floor plate 13
8 top cover
9, 10 side walls
11, 111, 211 front wall
12 frame
13 floor plate
14 handle
15 stop
16, 116, 216 spring element
17, 117, 217 holder element
18, 118, 218 projection
19 ramp surface
20 edge of front wall 11
21, 121, 221 hollowed-out area, recess, hole
22 displacement-limiting element
23, 123 slanted end surface, tool engagement surface
24 fastening holes
25 passage opening
124 leading edge of 118
225 insert

The invention claimed is:

1. A draft shield for a balance, comprising:
a rectangular rear wall, having upper corners;
a rectangular front wall, having upper corners;
two side walls;
a top cover; and
rail members which extend from the upper corners of the rear wall to the upper corners of the front wall and carry guide tracks in which the top cover and the side walls are slidably seated, each rail member further comprising, at a front end thereof, a spring element and a holder element, such that each spring element and holder element is made with one piece with the associated rail member and is arranged on the rail member so that the front wall is secured to each rail member when inserted between the spring element and holder element of the rail member.

2. The draft shield according to claim 1, wherein:
a form-locked engagement resulting from a spring force of the spring elements secures the front wall to the rail members, in which:
each spring element comprises a projection for which the front wall has a corresponding hollowed-out area cooperating therewith; or each spring element comprises a hollowed-out area for which the front wall has a corresponding projection cooperating therewith;
with the projections pushed into the hollowed-out areas.

3. The draft shield according to claim 1, wherein:
a force-locked engagement resulting from a spring force of the spring elements secures the front wall to the rail members, in which:
each spring element comprises a projection for which the front wall has a corresponding hollowed-out area cooperating therewith; or
each spring element comprises a hollowed-out area for which the front wall has a corresponding projection cooperating therewith;
with the projections pushed into the hollowed-out areas.

4. The draft shield according to claim 3, wherein:
each spring element comprises a leaf spring with an insert, a fixed end of the leaf spring connected to the rail member and a free end thereof carrying the insert.

5. The draft shield according to claim 4, wherein: the spring element exerts a spring force in the direction towards the holder element.

6. The draft shield according to claim 4, wherein: the insert is arranged on a side of the spring element that faces towards the holder element.

7. The draft shield according to claim 2, wherein:
the hollowed-out areas comprise recesses or holes in the front wall.

8. The draft shield according to claim 4, wherein:
the insert comprises the projection.

9. The draft shield according to claim 4, wherein:
the insert comprises a recess designed for engagement with a projection of the front wall.

10. The draft shield according to claim 4, wherein:
the leaf spring extends in a plane that is parallel to the holder element.

11. The draft shield according to claim 4, wherein:
the leaf spring extends in a plane that is perpendicular to the holder element.

12. The draft shield according to claim 2, wherein:
the projection has one side that is slanted to form a ramp surface, so that when the front wall is inserted between the spring element and the holder element, the front wall comes first into contact with, and glides along, the ramp surface, pushing the projection out of the way of the front wall, facilitating the insertion of the front wall between the spring element and the holder element.

13. The draft shield according to claim 1, further comprising:
a displacement-limiting element of each rail member which limits the movement of the spring element away from the corresponding holder element.

14. The draft shield according to claim 1, further comprising:
a tool-engagement surface on each spring element where an external force can be applied to push the spring element away from the corresponding holder element.

15. The draft shield according to claim 2, wherein:
each spring element comprises a leaf spring with an insert, a fixed end of the leaf spring connected to the rail member and a free end thereof carrying the insert.

16. The draft shield according to claim 3, wherein:
the hollowed-out areas comprise recesses or holes in the front wall.

17. The draft shield according to claim 15, wherein:
the insert comprises the projection.

18. The draft shield according to claim 15, wherein:
the insert comprises a recess designed for engagement with a projection of the front wall.

19. The draft shield according to claim 15, wherein:
the leaf spring extends in a plane that is parallel to the holder element.

20. The draft shield according to claim 4, wherein:
the leaf spring extends in a plane that is perpendicular to the holder element.

21. The draft shield according to claim 3, wherein:
the projection has one side that is slanted to form a ramp surface, so that when the front wall is inserted between the spring element and the holder element, the front wall comes first into contact with, and glides along, the ramp surface, pushing the projection out of the way of the front wall, facilitating the insertion of the front wall between the spring element and the holder element.

* * * * *